United States Patent
Reddy et al.

(10) Patent No.: US 10,353,539 B2
(45) Date of Patent: Jul. 16, 2019

(54) EASY CREATION OF MOBILE CODE

(71) Applicant: PAYPAL, INC., San Jose, CA (US)

(72) Inventors: Ken Reddy, Dublin (IE); Saulius Zukauskas, Dublin (IE)

(73) Assignee: PAYPAL, INC., San Jose, CA (US)

( * ) Notice: Subject to any disclaimer, the term of this patent is extended or adjusted under 35 U.S.C. 154(b) by 923 days.

(21) Appl. No.: 14/810,399

(22) Filed: Jul. 27, 2015

(65) Prior Publication Data

US 2015/0331582 A1    Nov. 19, 2015

Related U.S. Application Data

(63) Continuation of application No. 13/245,598, filed on Sep. 26, 2011, now abandoned.

(51) Int. Cl.

| | |
|---|---|
| *G06F 8/36* | (2018.01) |
| *G06F 8/41* | (2018.01) |
| *G06F 17/22* | (2006.01) |
| *G06Q 20/08* | (2012.01) |
| *G06Q 20/32* | (2012.01) |
| *G06F 3/0481* | (2013.01) |
| *G06F 3/0484* | (2013.01) |
| *G06F 3/0488* | (2013.01) |

(52) U.S. Cl.
CPC ........ *G06F 3/04817* (2013.01); *G06F 3/0488* (2013.01); *G06F 3/04812* (2013.01); *G06F 3/04842* (2013.01); *G06F 8/36* (2013.01); *G06F 8/41* (2013.01); *G06F 17/2247* (2013.01); *G06Q 20/08* (2013.01); *G06Q 20/322* (2013.01)

(58) Field of Classification Search
CPC ...... G06Q 40/02; G06Q 20/10; G06F 3/0487; G06F 8/36
See application file for complete search history.

(56) References Cited

U.S. PATENT DOCUMENTS

| | | | | |
|---|---|---|---|---|
| 8,504,983 B1 * | 8/2013 | Englehart | ................. | G06F 8/34 |
| | | | | 717/105 |
| 8,893,077 B1 * | 11/2014 | Aiuto | ........................ | G06F 8/36 |
| | | | | 717/104 |

(Continued)

FOREIGN PATENT DOCUMENTS

| | | | | |
|---|---|---|---|---|
| WO | WO0177882 A1 * | 10/2001 | ............... | G06F 8/30 |

OTHER PUBLICATIONS

Borck, James R, "Tango moves data-driven apps to the Web—Highly extensible solution offers long-term usability", InfoWorld 22.19:84. InfoWorld Media Group, Inc., May 8, 2000 (Year: 2000).*

*Primary Examiner* — Eric T Wong
(74) *Attorney, Agent, or Firm* — Haynes and Boone, LLP

(57) ABSTRACT

A user is presented with a first display with certain parties and a second display on the same screen, where the user can drag and drop the parties on the first screen to the second screen to create a desired network flow. A service provider, such as a payment provider, builds code based on the network flow and zips it into a downloadable file. The user can then easily implement the zipped code into a mobile app that will allow a user to send data through the app using the payment provider. The zipped code uses a library of data options offered by the payment provider and allows the user to input custom variables into these options. Code is automatically generated for the user to use based on the user input.

20 Claims, 5 Drawing Sheets

(56) References Cited

U.S. PATENT DOCUMENTS

| | | | |
|---|---|---|---|
| 2004/0015832 A1* | 1/2004 | Stapp | G06F 8/30 717/106 |
| 2007/0256055 A1* | 11/2007 | Herscu | G06F 8/51 717/115 |
| 2008/0256509 A1* | 10/2008 | Mazzeranghi | G06F 8/36 717/106 |
| 2011/0066999 A1* | 3/2011 | Rabinovich | G06F 8/51 717/104 |
| 2011/0320316 A1* | 12/2011 | Randazza | G06Q 20/02 705/26.43 |
| 2012/0072350 A1* | 3/2012 | Goldthwaite | G06K 7/0004 705/44 |
| 2012/0143706 A1* | 6/2012 | Crake | G06Q 20/20 705/18 |
| 2012/0311433 A1* | 12/2012 | Pasupulati | G06Q 20/02 715/234 |
| 2013/0080324 A1* | 3/2013 | Reddy | G06Q 20/08 705/44 |
| 2013/0262309 A1* | 10/2013 | Gadotti | G06Q 20/3276 705/44 |
| 2014/0156512 A1* | 6/2014 | Rahman | G06Q 20/10 705/39 |

* cited by examiner

EASY CREATION OF MOBILE CODE

CROSS REFERENCE TO RELATED APPLICATIONS

This application is a continuation of and claims priority to U.S. patent application Ser. No. 13/245,598, filed Sep. 26, 2011, which is incorporated by reference in its entirety.

BACKGROUND

1. Field of the Invention

The present invention generally relates to electronic data and more particularly to data code creation on user devices.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or payment provider such as, for example, PayPal, Inc. of San Jose, Calif. Such payment providers can make transactions easier and safer for the parties involved. Purchasing with the assistance of a payment provider from the convenience of virtually anywhere using a mobile device is one main reason why on-line and mobile payments are growing very quickly. Payments can be easily made through mobile apps created by individuals and companies, where a user can utilize the payment provider through the app to make a payment for a service or item offered through the app.

However, with more and more sellers trying to take advantage of sales through a user's mobile device, there are many who do not know or have difficulty creating the code necessary to allow a user to make purchases through the app. This often involves trying to manually create code or hiring someone to create the code for payment portion of the app. The former can be difficult and time consumer, and the latter can be costly.

Therefore, it is desirable to allow a user to quickly and easily create code to allow a payment through a mobile app.

SUMMARY

According to one embodiment, a user is presented with a first display with parties to a payment transaction and a second display on the same screen, where the user can drag and drop the parties on the first screen to the second screen to create a desired payment flow. A service provider, such as a payment provider, builds code based on the payment flow and zips it into a downloadable file. The user can then easily implement the zipped code into a mobile app that will allow a customer to make a purchase through the app using the payment provider.

The zipped code uses a library of payment options offered by the payment provider and allows the user to input custom variables into these options. Code is automatically generated for the user to use based on the user input.

In one embodiment, the first display includes a sender (e.g., the customer or payer), a primary recipient, and one or more secondary recipients. The user first drags a sender icon or image onto the second display. Any suitable combination of primary and secondary recipients can also be dragged and dropped. If a particular drag and drop operation is prohibited, a screen may pop up or overlay informing the user the reasons why the action was not allowed. Once the user is satisfied with the flow shown on the second display, the user may select a specific type of device or operating system the code will reside on. In one embodiment, the user can select from iOS code for an Apple iPhone, iPad, or iPod, Android code for Android platforms, and Blackberry code for Blackberry products. The appropriate code is generated and zipped, which can then be loaded into the user's app.

As a result, a user can quickly and easily introduce a desired payment flow into a mobile app.

In other embodiments, different combinations of features or entities can be shown on the first display to allow the user to generate code specific to different payment scenarios.

These and other features and advantages of the present disclosure will be more readily apparent from the detailed description of the embodiments set forth below taken in conjunction with the accompanying figures.

Figure 1:
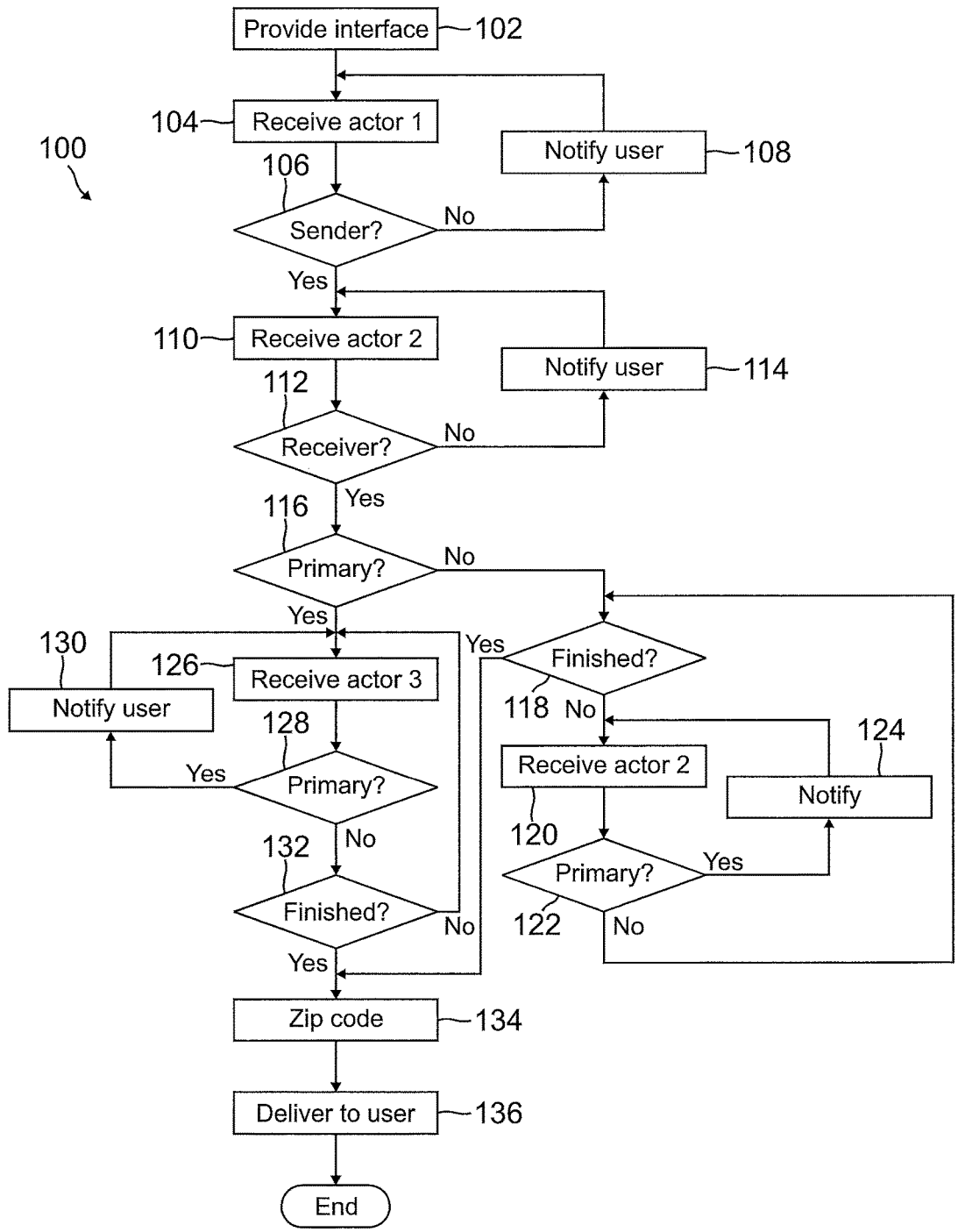
FIG. 1 is a flowchart illustrating a method for the user to make payments based on user location through a payment provider according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart illustrating an exemplary method 100 a service provider performs to create and provide code to a user so that the user can employ a payment process for customers to use on their mobile device. Service provider can be a payment provider, such as PayPal, Inc. of San Jose, Calif. At step 102, the payment provider provides the user with an interface to allow the user to easily create a desired payment flow. The interface may be provided on a user's computing device, such as a PC, laptop, tablet, or smart phone, through any suitable means, such as a link or downloadable file. Once accessed, the interface, which will be described in more detail below, presents the user with two screens. The first screen instructs the user to drag and drop payment flow "actors" onto the screen. The second screen instructs the user to select payment actors from a list, which can be dragged and dropped from the second screen onto the first screen.

In this embodiment, there are three actors: a sender, a primary receiver, and a receiver. The sender is the party/person/entity sending money, such as a buyer. The primary receiver is the party/person/entity receiving the money from the sender. The receiver is the party/person/entity receiving money from the primary receiver. This allows the user to set up payment flows for a simple payment, parallel payments, or chained payments. A simple payment is a payment from the sender to a single receiver. A parallel payment is a payment from the sender to a plurality of receivers. A chained payment is from the sender to the primary receiver, who then sends all or a portion to one or more receivers. In the current embodiment, the maximum number of receivers is three, and only a single primary receiver is allowed. However, in other embodiments, those numbers can vary, such as from two to six or more recipients and more than one primary recipient. The number of types of actors may also vary. For example, here there are three types of actors. However, in other embodiments, there may be four or more types.

Once the user is presented with the interface and screens, the user drags a first actor (actor 1) from the second screen to the first screen. This communicates the action to the payment provider, who receives actor 1 at step 104. Actor 1 may be the sender, primary recipient, or a recipient. Attributes associated with actor 1 are conveyed to the payment provider, such as to a server managed by the payment provider, through the user device.

At step 106, the payment provider determines whether actor 1 is a sender. If actor 1 is not a sender, i.e., the user dragged the primary receiver or the receiver onto the first screen, actor 1 is not placed on the first screen, and the payment provider notifies the user at step 108. The notification can be on the interface, such as an overlay screen that informs the user why the primary receiver or the receiver cannot be used in this step. After closing the overlay screen, the user may select actor 1 again, where actor 1 is received by the payment provider at step 104.

Once the received actor 1 is determined to properly be the sender, the sender is placed on the first screen, such as at the top or left side of the first screen. An arrow may be displayed, pointing outward from the sender, indicating the direction of the payment flow. The user then selects a second actor (actor 2) from the second screen and drags and drops actor 2 onto the first screen. The payment provider receives information or attributes about actor 2 at step 110.

A determination is then made at step 112 whether actor 2 is a receiver. If not, e.g., the user selected a sender as actor 2, the user is notified at step 114, such as through an overlay screen described above. The notification may inform the user why a sender is not an appropriate actor at this step. After closing the overlay screen, the user may select actor 2 again, where actor 2 is received by the payment provider at step 110.

Once the received actor 2 is determined to properly be a receiver of funds, a determination is made, at step 116, whether the receiver is a primary receiver. If actor 2 is not a primary receiver, i.e., actor 2 is a secondary receiver (or just receiver), a determination is made at step 118 whether the user is finished with the payment flow. If the user is finished, the payment flow is a simple payment process in which a sender sends funds to a receiver. The receiver is placed on the first screen of the user interface at the end of the arrow, such that the user sees a sender, an arrow pointing from the sender to the receiver, and the receiver at the end of the arrow.

The determination at step 118 may include the payment provider receiving information from the user, such as through the interface on the user device, that the user has finished the payment flow. In one embodiment, the interface includes links, buttons, or icons associated with a type of code for a mobile device. When the user selects a link, the payment provider knows that the user is finished and ready to have the code generated and provided. In another embodiment, the user may simply select a button or link that indicates "Done" or "Finished."

Once finished, the payment provider generates and zips the appropriate code at step 134. In one embodiment, the user selects the type of appropriate code from the user interface. For example, types of codes available may include from iOS code for an Apple iPhone or iPad, Android code for Android platforms, and Blackberry code for Blackberry products. Once the type of code is determined by the user and received by the payment provider, such as through the interface, the payment provider generates the code.

The zipped code allows the user to implement the payment process on a mobile device. Thus, the user may install the code, which will enable a customer to make a purchase or payment on the customer's mobile device with the services of the payment provider. For example, a customer may access a user's app on the customer's phone and make a payment with the flow created by the user.

At step 136, the zipped code is delivered to the user. For example, the payment provider may present the user with a zipped folder of files and/or documents on a screen of the user's device. The user may then access the folder to install the code. The folder may also include documentation and/or manuals for use. In this example, the user has created a simple payment flow having one sender and one receiver.

Returning back to step 118, if it is determined that the user has not finished with the desired payment flow, another actor is selected by the user and received by the payment provider at step 120. Note that the notation of actor 2 in the flowchart does not limit the selection to be the second actor. It is meant simply to convey a continuation of the payment flow from step 110.

Once received, the payment provider determines, at step 122, whether the received actor is proper. A proper actor at this stage of the payment flow would be a receiver (not a primary receiver or a sender). If the selected and received actor is not proper, the user is notified at step 124, where notification can be similar to the notifications at steps 108 and 114 described above. Thus, the payment provider will allow the user to select and for the payment provider to receive additional receivers at step 120 until a maximum limit is reached. In this embodiment, the number is three; however more than three is also possible.

When finished or the maximum number reached, the payment provider generates and zips the appropriate code (at step 134) and delivers the code to the user (at step 136). Here, the user has created a parallel payment flow having one sender and two or more recipients.

Returning back to step 116, if it is determined that the actor received from the user at step 110 is a primary receiver, the user next selects a third actor (actor 3) from the second screen of the interface. The payment provider receives the selection of actor 3 at step 126 and determines, at step 128, whether the received actor 3 is a primary actor or a sender (both improper actors at this stage of the flow). If so, the user is notified, at step 130, that an improper actor has been selected. The user can then select again an actor from the second screen, which is received again by the payment provider at step 126.

If the received actor 3 is a proper actor (i.e., not a sender or a primary recipient, but rather a recipient), a determination is made, at step 132, whether the user is finished with the payment flow. At this stage, the user has selected a sender, a primary recipient, and a recipient for a chained payment flow. If the user has finished, such as determined by the user selecting an appropriate link or button or by the user selecting a type of code to generate, the code is generated and zipped at step 134 and delivered to the user at step 136. This then allows the user to implement a chained payment flow with one sender, one primary recipient, and one recipient. This may be the case where the sender sends $100 to the primary recipient, who keeps $40 and sends $60 to the recipient.

If, as determined at step 132, the user has not finished the desired payment flow, the user continues to select actors (which necessarily have to be recipients in this embodiment) until the desired or maximum number of recipients is reached. At that time, the payment provider generates and zips the appropriate code, at step 134, for the user-created payment flow and delivers the code to the user at step 136. The code thus delivered allows the user to implement a chained payment flow with one sender, one primary recipient, and two or more recipients. For example, the sender can send $100 to the primary recipient, the primary recipient keeps $20, and primary recipient sends $40 to a first recipient, $10 to a second recipient, and $30 to a third recipient.

As a result, a user is able to quickly and easily create a desired payment flow using a simple drag and drop process on a single screen. Code is automatically generated by the payment provider and provided to the user for installation. The user can then accept payments through the payment provider from customers on a mobile device.

Figure 2A:
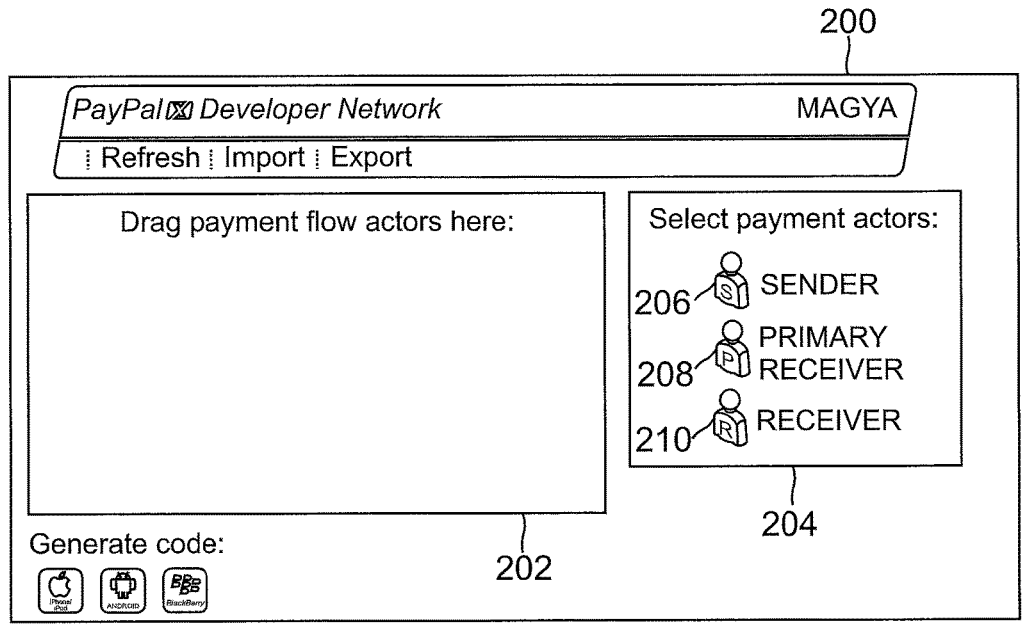
FIGS. 2A-2F are exemplary screen shots a user sees in using the drag and drop process of FIG. 1 to create a zipped payment process code for a mobile app.

FIGS. 2A-2F are exemplary screen shots a user sees in using the drag and drop process of FIG. 1 to create a zipped payment process code for a mobile app. In FIG. 2A, an interface 200 is provided by the payment provider on a computing device, such as a PC. Interface 200 includes a first screen 202 and a second screen 204. First screen 202 is where the user drags and drops actors for the desired payment flow. Second screen 204 is where the actors are dragged from. Second screen includes, in this embodiment, three actors, although more or less may be shown. A sender 206, a primary receiver 208, and a receiver (or secondary receiver) 201 are visually shown with an icon and text. The user can place a mouse over the desired actor, click, hold, drag the actor to first screen 202, and release to drop the actor. Other ways of dragging and dropping or selecting may also be used. For example, the user may click on an actor, move the mouse, and click again. The user may also place a pointer or finger on the desired actor and move the actor to first screen 202.

Figure 2B:
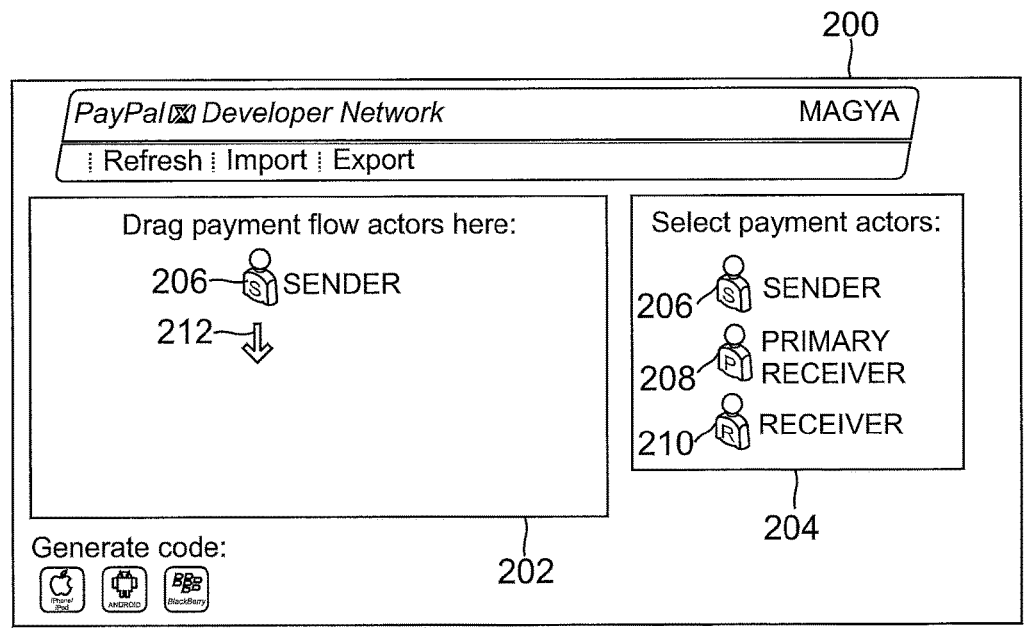

In FIG. 2B, the user has dragged and dropped sender 206 from second screen 204 onto first screen 202, where sender 206 is shown with an arrow 212 indicating a directional flow of funds from the sender. This can be achieved by using JQuery open source code and HTML 5 drag and drop functionality. Backend code is thus activated and a placeholder is placed that will be used when the code samples are generated.

Figure 2C:
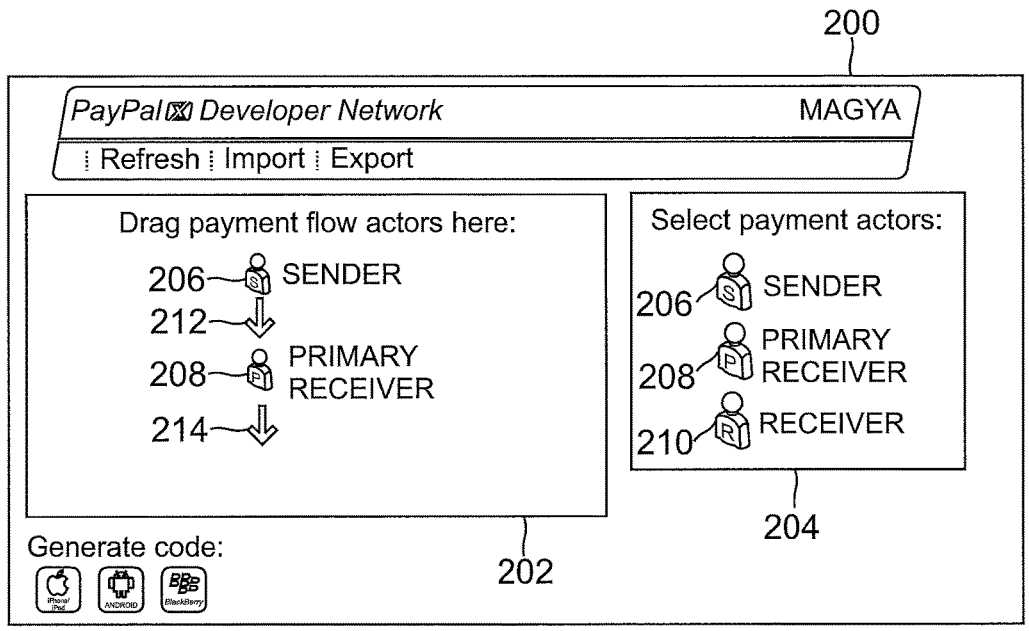

In FIG. 2C, the user has dragged and dropped primary receiver 208 from second screen 204 onto first screen 202. The user can drop primary receiver 208 anywhere on first screen 202, and primary receiver 208 will "snap" to a desired position directly underneath arrow 212. An arrow 214 is also displayed indicating a continued directional flow of funds. The dragging and dropping activates the backend code and puts a placeholder that will be used when the code samples are generated.

In this example, the user is creating a chained payment flow. If the user wanted to create a simple payment flow or a parallel payment flow, the user would have dragged and dropped receiver 210, instead of primary receiver 208, after dragging and dropping sender 206.

Figure 2D:
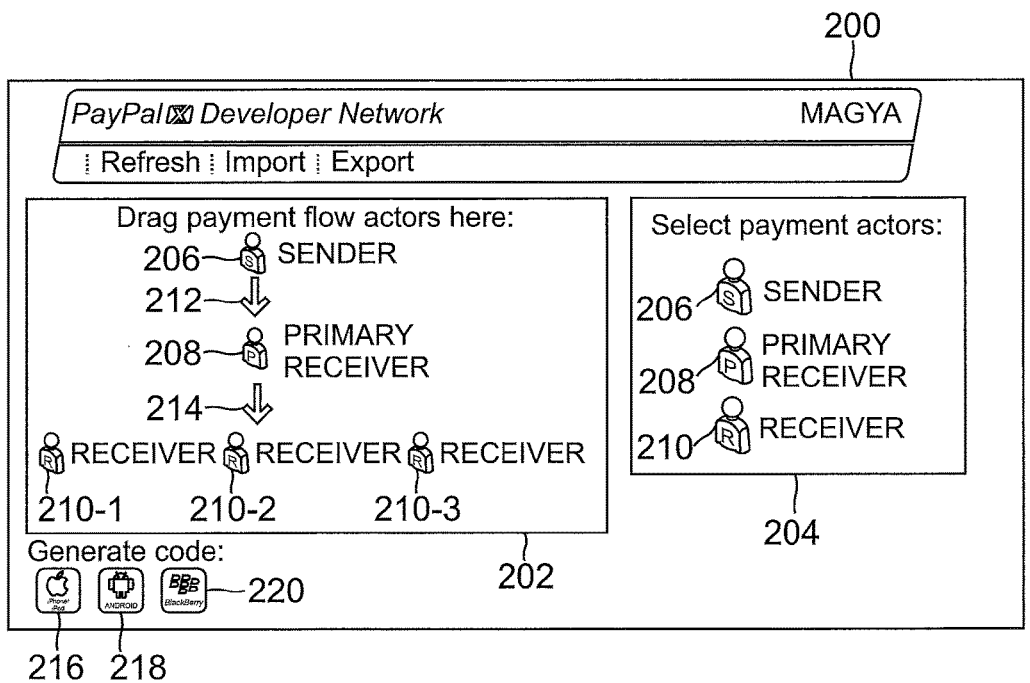

In FIG. 2D, the user has dragged and dropped receiver 210 three sequential times from second screen 204 onto first screen 202. The user can drop receiver 210 anywhere on first screen 202, and receiver 210 will "snap" to a desired position underneath arrow 214. Receiver 210 from second screen 204 is dropped three separate times onto first screen 202 to display a first receiver 210-1, a second receiver 210-2, and a third receiver 210-3. The dragging and dropping activates the backend code and puts a placeholder that will be used when the code samples are generated.

Also shown in FIG. 2D are three icons 216, 218, and 220, which represent three different types of code that can be generated, specific to different mobile devices or platforms. When icon 216 is selected by the user, iOS code for an Apple iPad or iPhone can be generated. When icon 218 is selected by the user, Android code for mobile devices using the Android platform, such as devices from LG, Samsung, HTC, Motorola, and Sony, can be generated. When icon 220 is selected by the user, Blackberry code for use on Blackberry mobile devices can be generated. In other embodiments, more or less codes can be included as icons or links selectable by the user.

Figure 2E:
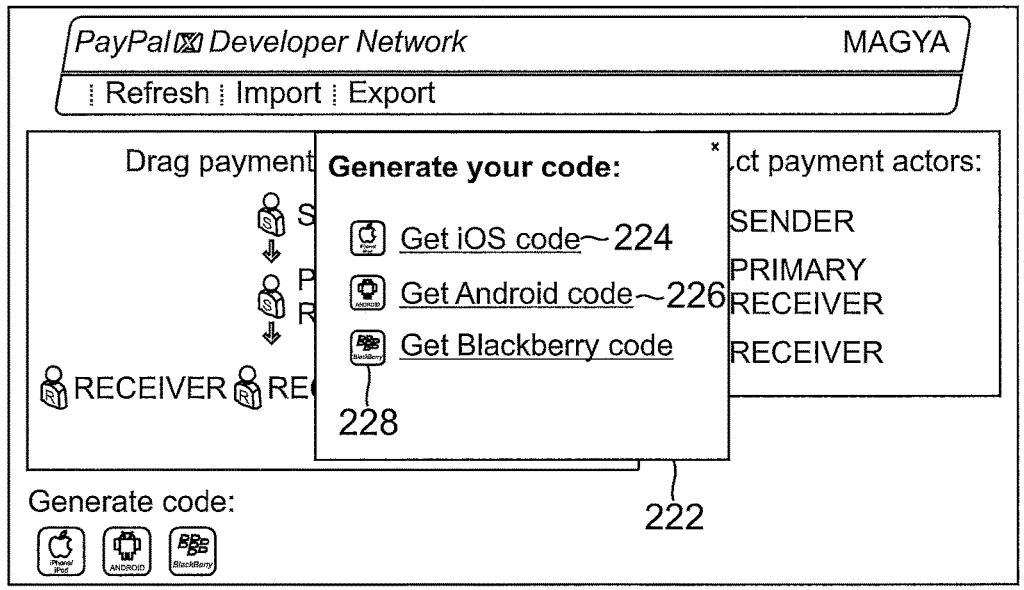

In FIG. 2E, the user has selected one of icons 216, 218, or 220, indicating to the payment provider that the user has finished the payment flow, and a JQuery light box option overlay window 222 is opened. Within overlay window 222 are icons/links 224 for getting iOS code, 226 for getting Android code, and 228 for getting Blackberry code. This actions a payment provider server to check the placeholders that were selected previously and generate the code for that device based on the mobile device option the user chose.

Figure 2F:
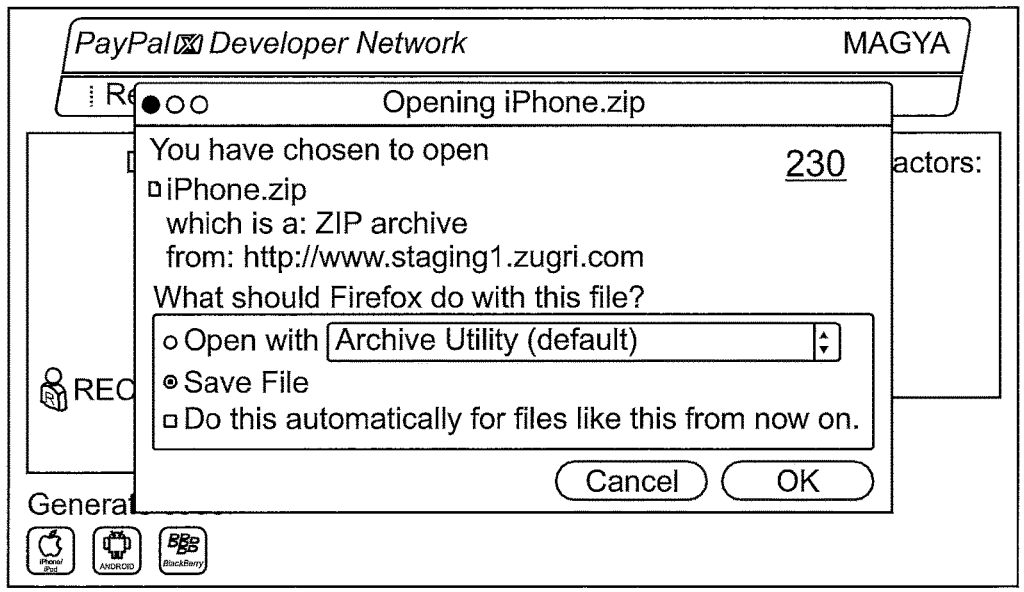

In FIG. 2F, the user has selected icon/link 224 to generate iOS code for an iPhone/iPad. The user is presented with a save dialog box 230 to save the code to add to the user's mobile application. A zip file is created and presented to the user (e.g., saved or opened) after the user selects a desired option and the "OK" button. The user may then open the file to access documents and other data to add the code and implement the desired payment flow. In another embodiment, dialog box 230 is not shown, and the zip file is created directly after the user selects an icon/link from overlay window 222 in FIG. 2E.

In an enterprise software environment, adding a middleman to software development and relying on any outside company for approval and usage terms drastically drains company resources, delays delivery dates, and limits enhanced functionality. The process described above overcomes this by utilizing HTML5, which is the new standard for enterprise and personal apps. This allows the payment provider to create a drag and drop solution for merchants on and off line to easily implement a payment flow into their mobile apps.

The general solution can be easily changed to used in many different areas. Some examples include at a point of sale (POS), at festival/show booths, at small merchants/restaurants, and for digital content providers. At a POS, the drag and drop solution can be implemented in outlets by changing the available options to choose color, add your own logo, choose layout style, payment provider branding options, and choice of device to run the code on.

At festival/show booths, the drag and drop can be combined with the POS solution to allow vendors to easily set up a payment system to sell goods/services and receive payment through a mobile app. The vendor could log onto the payment provider site and use the drag and drop interface to choose the options and layouts the vendor wants, upload a logo, download the customized payment code, and upload the code to the vendor's mobile platform of choice. The vendor can then start accepting payments.

Smaller retailers/merchants can benefit by being able to incorporate a payment flow with a payment provider and utilize the services quickly, easily, and at very little cost on mobile apps.

With digital content providers, they could use the drag and drop interface to create customized solutions for all their content needs using the payment provider as a payment option.

The following is a sample code for a front end breakdown and a backend breakdown. The sample code includes explanatory notes shown between double brackets.

Backend PHP Code

A payment provider, such as PayPal, may allow developers to use its Mobile Payment Library (MPL), such as on x.com, PayPal's developer portal, to create various payment options. These contain files to be used in developer projects while building mobile applications.

An exemplary logic of the drag and drop tool is as follows:

Based on user selected preferences on the front end (drag and drop) functionality backend scripts (PHP programming language) are automatically editing library project files with parameters provided by the user. After all changes are made, a full set of required files is archived (zipped) and provided for users to download. Here are the examples of such functionality in the backend:

Changing file contents:

```
<?php
$fname = "anyrequiredfile.txt";
$exclude = "replaceable string";
$lines = file($fname);
$out = "";
foreach ($lines as $line) {
  if (strstr($line, $exclude) == "") {
    $out .= $line;
  }
}
$f = fopen($fname, "w");
fwrite($f, $out);
fclose($f);
?>
```

Archiving files and making them available to end users:

```
<?php
function create_zip($files = array( ),$destination = '',$overwrite = false) {
    if(file_exists($destination) && !$overwrite) { return false; }
    $valid_files = array( );
    if(is_array($files)) {
        foreach($files as $file) {
            if(file_exists($file)) {
                $valid_files[ ] = $file;
            }
        }
    }
    if(count($valid_files)) {
        $zip = new ZipArchive( );
        if($zip->open($destination,$overwrite ? ZIPARCHIVE::OVERWRITE : ZIPARCHIVE::CREATE) != true) {
            return false;
        }
        //add the files
        foreach($valid_files as $file) {
            $zip->addFile($file,$file);
        }
        $zip->close( );
        //check to make sure the file exists
        return file_exists($destination);
    }
    else
```

-continued

```
    {
        return false;
    }
}
?>
```

This technology allows for various applications to be developed where file content can be customized according to GUI changes a user makes by using the drag and drop interface described herein.

Figure 3:
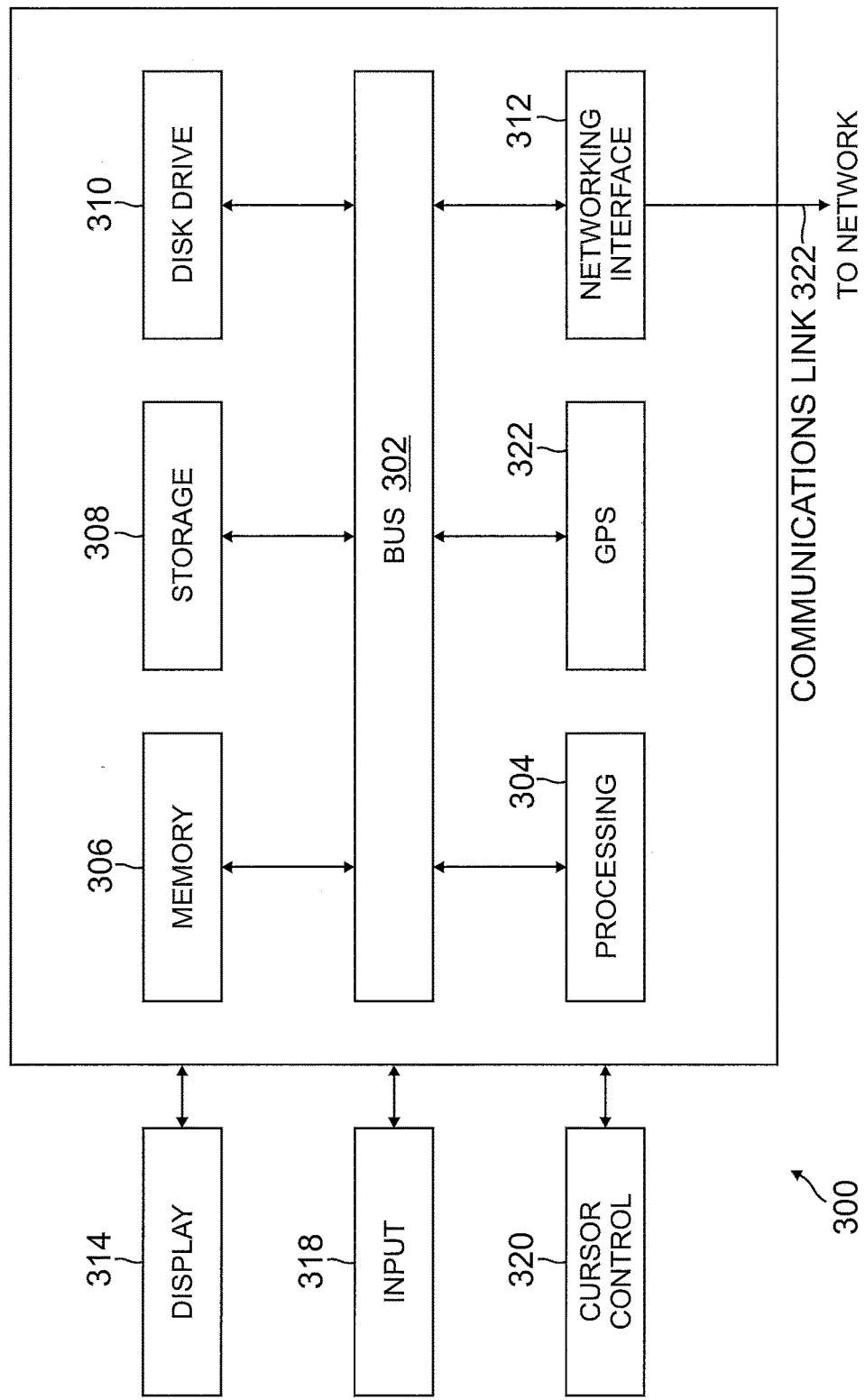
FIG. 3 is a block diagram of a networked system used in the payment system described above according to one embodiment.

FIG. 3 is a block diagram of a computer system 300 suitable for implementing, for example, devices used in the process described herein, including user and payment provider devices.

In accordance with various embodiments of the present disclosure, computer system 300, such as a computer and/or a network server, includes a bus 302 or other communication mechanism for communicating information, which interconnects subsystems and components, such as a processing component 304 (e.g., processor, micro-controller, digital signal processor (DSP), etc.), a system memory component 306 (e.g., RAM), a static storage component 308 (e.g., ROM), a disk drive component 310 (e.g., magnetic or optical), a network interface component 312 (e.g., modem or Ethernet card), a display component 314 (e.g., CRT or LCD), an input component 318 (e.g., keyboard, keypad, or virtual keyboard), a cursor control component 320 (e.g., mouse, pointer, or trackball), and/or a location determination component 322 (e.g., a Global Positioning System (GPS), a cell tower triangulation device, and/or a variety of other location determination devices known in the art). In one implementation, disk drive component 310 may comprise a database having one or more disk drive components.

In accordance with embodiments of the present disclosure, computer system 300 performs specific operations by processor 304 executing one or more sequences of instructions contained in memory component 306, such as described herein with respect to the user device and/or the payment provider device. Such instructions may be read into system memory component 306 from another computer readable medium, such as static storage component 308 or disk drive component 310. In other embodiments, hard-wired circuitry may be used in place of or in combination with software instructions to implement the present disclosure.

Logic may be encoded in a computer readable medium, which may refer to any medium that participates in providing instructions to processor 304 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 310, volatile media includes dynamic memory, such as system memory component 306, and transmission media includes coaxial cables, copper wire, and fiber optics, including wires that comprise bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by computer system 300. In various other embodiments of the present disclosure, a plurality of computer systems 300 coupled by a communication link 324 to network 310 (e.g., such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 324 and network interface component 312. Network interface component 312 may include an antenna, either separate or integrated, to enable transmission and reception via communication link 324. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        receiving a request over a network from a user device of a plurality of user devices;
        determining a first actor from the request based on first touch-sense data associated with movement of a first graphic icon from a first input area of a touchscreen interface of the user device to a second input area of the touchscreen interface;
        determining a second actor from the request based on second touch-sense data associated with movement of a second graphic icon from the first input area to the second input area;
        determining a type of computer code from the request based on third touch-sense data that indicates a selection received by the touchscreen interface;
        executing backend code based at least on the first actor, the second actor, and the type of the computer code;
        generating network flow code based at least on the execution of the backend code; and
        transmitting the network-flow code to the user device, wherein the network-flow code enables the user device to perform actions in a network flow associated with the first actor and the second actor.

2. The system of claim 1, wherein executing the backend code includes generating an archive file downloadable by the user device, and wherein the network-flow code transmitted to the user device comprises the archive file.

3. The system of claim 2, wherein the archive file enables the user device to perform the actions in the network flow associated with the first actor and the second actor.

4. The system of claim 1, wherein the backend code is executed based on one or more system validations of the first actor, the second actor, and or the type of the computer code.

5. The system of claim 1, wherein the network flow comprises at least one of a simple network flow associated with at least the first actor and the second actor, a parallel network flow associated with at least the first actor and the second actor, or a chained network flow associated with at least the first actor and the second actor, wherein the chained network flow comprises one or more additional network flows to additional actors.

6. The system of claim 1, wherein the operations further comprise determining one or more additional actors from the request based on fourth touch-sense data associated with movement of one or more additional graphic icons from the first input area of the touchscreen interface of the user device to the second input area of the touchscreen interface.

7. The system of claim 6, wherein at least one of the first actor or the second actor comprises a network flow sender, and wherein the one or more additional actors comprise a network flow recipient.

8. A method of generating computer code based on communications with a plurality of user devices over one or more networks, the method comprising:
    determining a first actor of a request from a user device of the plurality of user devices based on first touch-sense data associated with movement of a first graphic icon from a first input area of a touchscreen interface of the user device to a second input area of the touchscreen interface;
    determining a second actor from the request based on second touch-sense data associated with movement of a second graphic icon from the first input area to the second input area;
    determining a type of computer code from the request based on third touch-sense data in the request that indicates a selection received by the touchscreen interface;

generating network flow code based at least on execution of backend code associated with at least one of the first actor, the second actor, and the type of the computer code; and transmitting the network flow code to the user device, wherein the network flow code enables the user device to perform actions in a network flow associated with the first actor and the second actor.

9. The method of claim 8, wherein generating the network flow code comprises generating an archive file downloadable by the user device, and wherein transmitting the network flow code to the user device comprises transmitting the archive file to the user device.

10. The method of claim 9, wherein the archive file enables the user device to perform the actions in the network flow associated with the first actor and the second actor.

11. The method of claim 8, wherein generating network flow code is based on one or more system validations of the first actor, the second actor, and the type of the computer code.

12. The method of claim 8, wherein the network flow comprises at least one of a simple network flow associated with at least the first actor and the second actor, a parallel network flow associated with at least the first actor and the second actor, or a chained network flow associated with at least the first actor and the second actor, wherein the chained network flow comprises one or more additional network flows to additional actors.

13. The method of claim 8, further comprising determining one or more additional actors from the request based on fourth touch-sense data associated with movement of one or more additional graphic icons from the first input area of the touchscreen interface of the user device to the second input area of the touchscreen interface, wherein at least one of the first actor or the second actor comprises a network flow sender, and wherein the one or more additional actors comprise a network flow recipient.

14. A non-transitory machine-readable memory having stored thereon machine-readable instructions executable to cause a machine to perform operations comprising:

determining a first actor of a request from a user device of a plurality of user devices based on first touch-sense data associated with a movement of a first graphic icon from a first input area of a touchscreen interface of the user device to a second input area of the touchscreen interface;

determining a second actor from the request based on second touch-sense data associated with a movement of a second graphic icon from the first input area to the second input area;

determining a type of computer code from the request based on third touch-sense data in the request that indicates a selection received through the touchscreen interface;

generating network flow code based at least on execution of backend code associated with at least one of the first actor, the second actor, or the type of the computer code; and transmitting the network flow code to the user device, wherein the network flow code enables the user device to perform actions in a network flow associated with the first actor and the second actor.

15. The non-transitory machine-readable memory of claim 14, wherein executing the backend code includes generating an archive file downloadable by the user device, and wherein the network-flow code transmitted to the user device comprises the archive file.

16. The non-transitory machine-readable memory of claim 15, wherein the archive file enables the user device to perform the actions in the network flow associated with the first actor and the second actor.

17. The non-transitory machine-readable memory of claim 14, wherein the backend code is executed based on one or more system validations of the first actor, the second actor, or the type of the computer code.

18. The non-transitory machine-readable memory of claim 14, wherein the network flow comprises at least one of a simple network flow associated with at least the first actor and the second actor, a parallel network flow associated with at least the first actor and the second actor, or a chained network flow associated with at least the first actor and the second actor, wherein the chained network flow comprises one or more additional network flows to additional actors.

19. The non-transitory machine-readable memory of claim 14, wherein the operations further comprise determining one or more additional actors from the request based on fourth touch-sense data associated with movement of one or more additional graphic icons from the first input area of the touchscreen interface of the user device to the second input area of the touchscreen interface.

20. The non-transitory machine-readable memory of claim 19, wherein at least one of the first actor or the second actor comprises a network flow sender, and wherein the one or more additional actors comprise a network flow recipient.

* * * * *